(12) United States Patent
Shillingford et al.

(10) Patent No.: US 12,579,384 B2
(45) Date of Patent: Mar. 17, 2026

(54) SMART CONTRACT GENERATION SYSTEM AND METHODS

(71) Applicant: DeepSee.ai Inc., Draper, UT (US)

(72) Inventors: Stephen W. Shillingford, Salt Lake City, UT (US); Bryan W. Sparks, Lindon, UT (US); Ryan W. McQueen, Sandy, UT (US)

(73) Assignee: DeepSee.ai Inc., Draper, UT (US)

( * ) Notice: Subject to any disclaimer, the term of this patent is extended or adjusted under 35 U.S.C. 154(b) by 320 days.

(21) Appl. No.: 17/693,216

(22) Filed: Mar. 11, 2022

(65) Prior Publication Data

US 2022/0292268 A1     Sep. 15, 2022

Related U.S. Application Data

(60) Provisional application No. 63/159,761, filed on Mar. 11, 2021.

(51) Int. Cl.
*G06F 40/56* (2020.01)
*G06F 16/3349* (2025.01)
*G06F 40/12* (2020.01)

(52) U.S. Cl.
CPC .......... *G06F 40/56* (2020.01); *G06F 16/3349* (2019.01); *G06F 40/12* (2020.01)

(58) Field of Classification Search
CPC ....... G06F 40/56; G06F 16/3349; G06F 40/12

USPC .................................................... 704/4, 9–10
See application file for complete search history.

(56) References Cited

U.S. PATENT DOCUMENTS

| | | | | |
|---|---|---|---|---|
| 2018/0005186 A1* | 1/2018 | Hunn | .................... | G06F 16/219 |
| 2020/0372341 A1* | 11/2020 | Asai | ........................ | G06N 3/045 |
| 2020/0372505 A1* | 11/2020 | Turgman | ............ | G06Q 20/0658 |
| 2020/0410460 A1* | 12/2020 | Nissan | .................... | G06F 18/22 |
| 2022/0261551 A1* | 8/2022 | Liu | ......................... | G06F 40/30 |

* cited by examiner

*Primary Examiner* — George C Monikang
(74) *Attorney, Agent, or Firm* — PCFB, LLC; Justin K. Flanagan

(57) ABSTRACT

A system for generating smart contracts may include a first subsystem to receive a written or verbal contract, and a second subsystem to identify terms of the contract using natural language processing (NLP). The system may additionally include a third subsystem to correlate processed NLP terms of the contract with chaincode in a library, and a fourth subsystem to combine correlated NLP terms to generate a smart contract. Methods of generating a smart contract may include inputting natural language contract terms into a smart contract generation system and identifying the natural language contract terms with a natural language processing system. The method may further include correlating at least some of the contract terms to chaincodes stored in a library, generating chaincodes for any contract terms that do not correlate to any chaincodes stored in the library, and assembling the chaincodes into a smart contract.

7 Claims, 5 Drawing Sheets

200

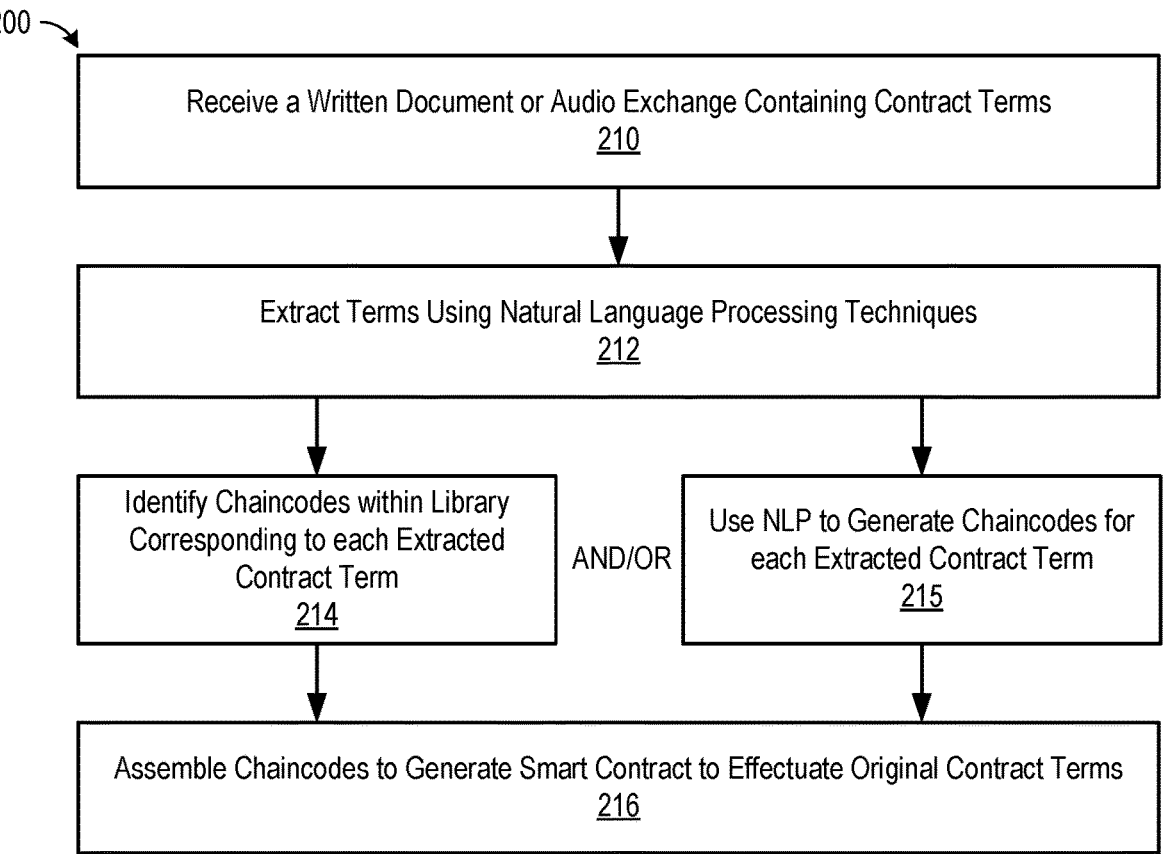

Receive a Written Document or Audio Exchange Containing Contract Terms
210

Extract Terms Using Natural Language Processing Techniques
212

Identify Chaincodes within Library Corresponding to each Extracted Contract Term
214

AND/OR

Use NLP to Generate Chaincodes for each Extracted Contract Term
215

Assemble Chaincodes to Generate Smart Contract to Effectuate Original Contract Terms
216

FIG. 2A

SMART CONTRACT GENERATION SYSTEM AND METHODS

RELATED APPLICATION

This application claims priority to U.S. Provisional Patent Application No. 63/159,761, filed on Mar. 11, 2021, titled "Smart Contract Generation," which is incorporated herein in its entirety by this reference.

TECHNICAL FIELD

This application generally relates to natural language processing, smart contracts, block chain technologies, and computer systems. More specifically, embodiments of the present disclosure relate to systems and methods for generating smart contracts from natural language contract terms.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

FIG. 2A illustrates a flow diagram of one method for generating a smart contract, according to one embodiment.

DETAILED DESCRIPTION

Figure 1:
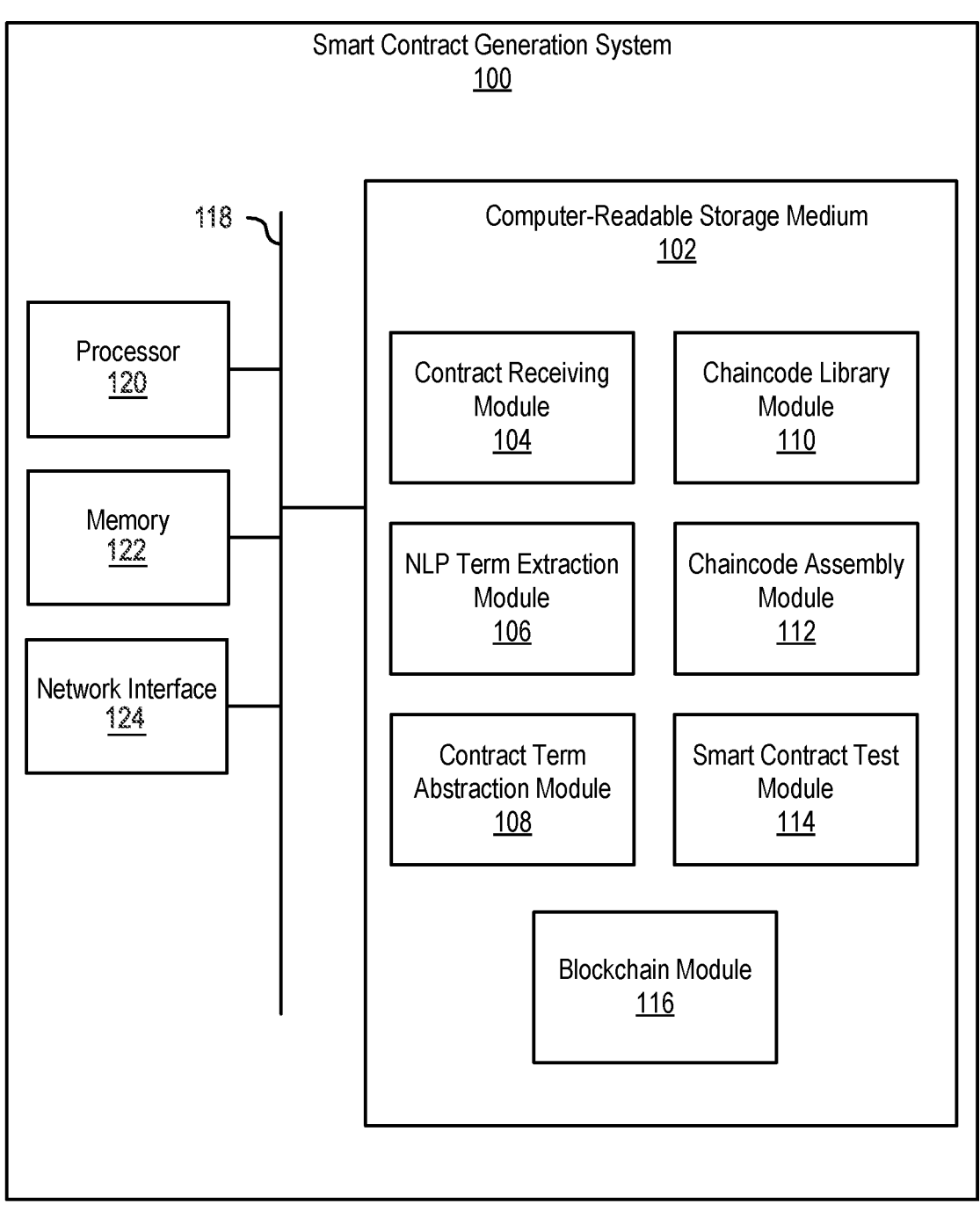
FIG. 1 illustrates an example of a system for implementing the various processes and methods described herein, according to various embodiments.

A contract is generally considered a written or verbal agreement, usually between two parties, that establishes the details and terms of an exchange for goods or services. Contracts usually include mutual assent by all relevant or signing parties and include an expression of offer and acceptance. Even between two private parties, contracts can be considered legally enforceable so long as they meet certain requirements that may vary by legal jurisdiction. For example, some jurisdictions may require contracts to include adequate consideration and be signed by parties of sufficient capacity and legality.

When contracts are breached by one or more parties, the party suffering damage can seek legal redress from legal institutions, such as courts of law. The remedies provided by the courts may not sufficiently address the harm or damage suffered by a party or parties to a breached contract. Moreover, the cost to enforce a contract or seek redress for breach of a contract may be high and/or impractical in some circumstances, especially in contracts involving multiple parties in disparate legal jurisdictions. In some instances, escrow agents and/or escrow accounts are used that involve a trusted third party that takes possession of property or funds to ensure enforcement of a contract.

Smart contracts differ from traditional contracts in many ways. In general terms, a smart contract is a self-executing contract usually embodied as a computer program or transaction protocol. In smart contracts, the terms of the agreement between two parties (e.g., a buyer and a seller) are directly written into lines of code that are automatically executed in response to triggering events. The code of a smart contract may be distributed and decentralized. For example, the smart contract may be implemented using distributed ledger technology, such as a blockchain network that is trusted to maintain the integrity and execution of the smart contract. Smart contracts facilitate the implementation of transactions between parties without requiring any trust between the parties. Many smart contracts, especially those on distributed ledgers (e.g., decentralized ledgers, blockchains, etc.), are irreversible once they are coded and submitted.

Unlike regular contracts, smart contracts may be (automatically) enforceable regardless of whether they constitute a valid binding agreement between parties in a particular jurisdiction. The U.S. National Institute of Standards and Technology describes smart contracts as broadly encompassing code and data (sometimes referred to as functions and states) that are deployed using cryptographically signed transactions on a blockchain network or another distributed ledger. Smart contracts cannot be manipulated once they are stored into a blockchain or distributed ledger. A smart contract can be programmed in various programming languages (e.g., as "chaincodes") supported by various distributed ledgers, such as blockchains. Examples of blockchain platforms that support smart contracts include Bitcoin and Ethereum. Bitcoin supports a Turing-incomplete script language that allows for the creation of smart contracts or chaincodes. Ethereum supports a Turing-complete language on its blockchain. Examples of programming languages used to write chaincodes are, without limitation, Simplicity, Scilla, Bitcoin Script, Solidity, Ivy, etc.

The concepts of natural language processing broadly relate to the ways in which computers process human language in written and/or oral formats. Natural language processing often includes other computerized tasks, such as speech recognition and optical character recognition. A natural language processing system (which may be a subsystem of a smart contract generation system, as described below) may utilize a trained machine learning model, such as the generative pre-trained transformer 3 (GPT-3) autoregressive language model that uses deep structured learning. The natural language processing system may utilize other machine learning models, neural network types, artificial intelligence techniques, regression analysis, Bayesian networks, and the like. In some embodiments, the smart contract generation system utilizes a bidirectional encoder representation from transformers (BERT) language model that is fine-tuned with finance and legal training data sets. The fine-tuned BERT model used by the smart contract generation system described herein can be referred as the FILBERT natural language model due to the specific finance and legal processing abilities.

According to various embodiments, a smart contract generation system may receive structured or unstructured documents that include contracts or terms of a contract. For example, the system may receive a legal contract executed by one or more parties. As another example, the system may receive a term sheet in the form of a high-level outline of the basic terms for a contract or agreement that has not yet been drafted. As another example, the system may receive correspondence between two or more parties that represent negotiations or agreements to the terms of a planned contract.

The system may extract contract terms from the structured or unstructured documents. Examples of relevant terms include, but are not limited to, names of parties, addresses of parties, execution dates, completion dates, milestone dates, milestone metrics, payment terms, deadlines, terms for cancellation of the contract, legal jurisdiction, conditions of the contract, warranties made by a party, representations made by a party, various innominate terms, etc. According to various embodiments, extraction of the terms may be performed using a machine learning model trained for a specific type of contract, for a wider range of general contracts, or for more generalized natural language.

The system may include or have access to a library of chaincodes, where each chaincode is associated with one or more contract terms. Accordingly, the system may identify a contract term, as described above, and then search the library of chaincodes to identify a chaincode associated with the contract term. Rules of abstraction may be utilized such that larger contract terms may, in some cases, be subdivided into smaller contract terms. A chaincode for each smaller contract term may be identified within the library of chaincodes. The identified chaincodes for the smaller contract terms may be assembled to correspond to the larger contract term. Ultimately, a collection of chaincodes is assembled and organized to represent the smart contract equivalent of the original document containing the contract terms (e.g., an actual contract, a term sheet, correspondence, etc.).

According to various embodiments, natural language processing techniques analyze the documents or audio files that contain contract terms and generate a corresponding chaincode in a target language (e.g., script, protocol, or programming language). In some embodiments, the chaincode generated by the natural language processing system can be used directly. In other embodiments, the chaincode generated by the natural language processing system can be compared with chaincodes stored within a library of chaincodes for a closest match. The chaincodes within the library of chaincodes may be preferred because they are preapproved and/or previously edited by a human programmer or developer. In some embodiments, if a matching chaincode is not found within the library of chaincodes, the system may use the chaincode generated by the natural language processing system and add the new chaincode to the library of chaincodes for future use.

In yet further embodiments, natural language processing techniques may be utilized to analyze the documents or audio files that contain contract terms and generate a corresponding computer code in a target language (e.g., script, protocol, or programming language). The computer code may then be compared with chaincodes stored within a library of chaincodes for a closest match. Additionally, the computer code may be utilized to generate chaincodes directly.

In some embodiments, human developers and/or programmers may review chaincodes generated by the natural language processing system for accuracy and intended functionality. Additionally, the contracting parties and/or their attorneys may review the functionality of the chaincodes generated to confirm that the chaincodes accurately correlate to the natural language contract terms. Revised or corrected chaincodes may be fed back into a machine learning-based natural language processing system as training material to improve future chaincode outputs. Accordingly, various embodiments may utilize reinforced learning for the machine learning models supporting the smart contract generation system. The quality of the chaincodes may be improved over time through reinforced learning methods of improving a fine-tuned natural language processing machine learning model. Additional examples of fine-tuning natural language processing machine learning models are described below that leverage principles of transfer learning.

In some embodiments, the natural language processing system (or subsystem) may be created by fine-tuning an existing machine learning natural language processing model trained with a general English language dataset (or other target language). That is, the natural language processing system or subsystem configured to convert English language contract terms to chaincodes did not previously exist. However, utilizing "transfer learning," existing natural language processing models trained with general or generic English language datasets can be trained with fine-tuned datasets with an emphasis on contract terms, legal terms, programming languages, scripts, distributed ledger languages and protocols, blockchain protocols, and/or other materials to support conversion of contract terms to chaincodes for execution on a blockchain or ledger-based platform. It is appreciated that a wide variety of predictive modeling algorithms can be utilized.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, Field Programmable Gate Array, or another customized or programmable device. The computer may also include a computer-readable storage device, such as non-volatile memory, static RAM, dynamic RAM, ROM, CD-ROM, disk, tape, magnetic, optical, flash memory, or another computer-readable storage medium. Additionally, the infrastructure may include various peripheral devices (i.e., input devices and output devices) such as a display, a keyboard, a mouse, a scanner, a camera, a microphone, a speaker, a printer, and/or a modem.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc., that perform one or more tasks or implement particular data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations may not be shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an example of a smart contract generation system 100 for implementing the various processes and methods described herein, according to various embodiments of the present disclosure. As illustrated, the system 100 may include a bus 118 that connects a processor 120, a memory 122, and a network interface 124 to a computer-readable storage medium 102, such as a non-transitory computer-readable storage medium. The computer-readable storage medium 102 may include a contract receiving module 104 to receive a contract. In some embodiments, the contract receiving module 104 may receive a contract in written form (e.g., a structured or unstructured document) or in an oral form (e.g., an audio exchange). A natural language processing term extraction module 106 may extract contract terms from the received contract. As described herein, the natural language processing term extraction module 106 may utilize machine learning models as described herein (including fine-tuned natural language processing models leveraging principles of transfer learning, as described herein).

In some embodiments, the smart contract generation system 100 may include a contract term abstraction module 108 to identify compound contract terms and separate out individual component contract terms. In some embodiments, the natural language processing term extraction module 106 may automatically generate chaincodes for each identified contract term (e.g., each compound contract term, each discrete contract term, and/or each component contract term). In some embodiments, a chaincode library module 110 includes a plurality of chaincodes in a library, database, or catalog. The identified contract term may be matched with a corresponding (e.g. correlated) chaincode within the chaincode library module 110. In alternative embodiments, a natural language processing model, such as the FILBERT natural language model described herein, may be used to directly generate and/or populate the chaincode library module 110. Additionally, user feedback, revisions, and/or edits to the individual chaincodes and/or final smart contract may be provided as feedback into the machine learning models as additional training data for reinforced learning.

In some embodiments, a chaincode assembly module 112 may assemble individually matched chaincodes (i.e., contract terms matched to individual chaincodes or chaincode snippets) to form a complete smart contract. A smart contract test module 114 may test execution of the smart contract to verify an outcome or possible outcomes depending on triggering events or "states" defined in the smart contract. The contract terms, as processed by the natural language processing model, may be evaluated and compared with the outcomes of the smart contract to verify correct execution and functionality. Again, user feedback, revisions, and/or edits to the individual chaincodes and/or final smart contract may be provided as feedback into the machine learning model or other algorithms used for the smart contract test module 114. A block chain module 116 may provide an interface between the smart contract generation system 100 and various blockchains or ledger-based platforms.

Accordingly, a system for generating smart contracts may include a first subsystem to receive a written or verbal contract, and a second subsystem to identify terms of the contract using natural language processing (NLP). The system may additionally include a third subsystem to correlate at least some of the processed NLP terms of the contract with chaincode in a library, and a fourth subsystem to combine correlated NLP terms to generate a smart contract.

FIG. 2A illustrates a flow diagram of a method 200 for generating a smart contract, according to an embodiment of the present disclosure. As illustrated, a smart contract generation system 200 may receive, at 210, a written document or audio exchange containing contract terms. The system may extract, at 212, terms, such as contract terms, from the received document or audio exchange using a natural language processing model (e.g., a machine learning-based model, such as a fine-tuned adaptation of GPT-3 or BERT model). The system may identify, at 214, chaincodes within a library of chaincodes that correspond to each extracted contract term. Alternatively, or additionally, the system may use a natural language processing system, such as a fine-tune natural language processing model (e.g., FILBERT or a fine-tuned GPT-3 based model) to generate, at 215, chaincodes that correspond to each extracted contract term. The system may then assemble, at 216, the individual chaincodes to generate a smart contract to effectuate the original contract terms using a smart contract in a blockchain or ledger-based platform (e.g., on a Bitcoin or Ethereum platform).

Accordingly, methods of generating a smart contract may include causing natural language contract terms to be input into a smart contract generation system and causing the natural language contract terms to be identified with a natural language processing system. The methods may also include causing the natural language contract terms to be correlated to chaincodes stored in a library and causing the chaincodes that correlate to the natural language contract terms to be assembled into a smart contract.

Figure 2B:
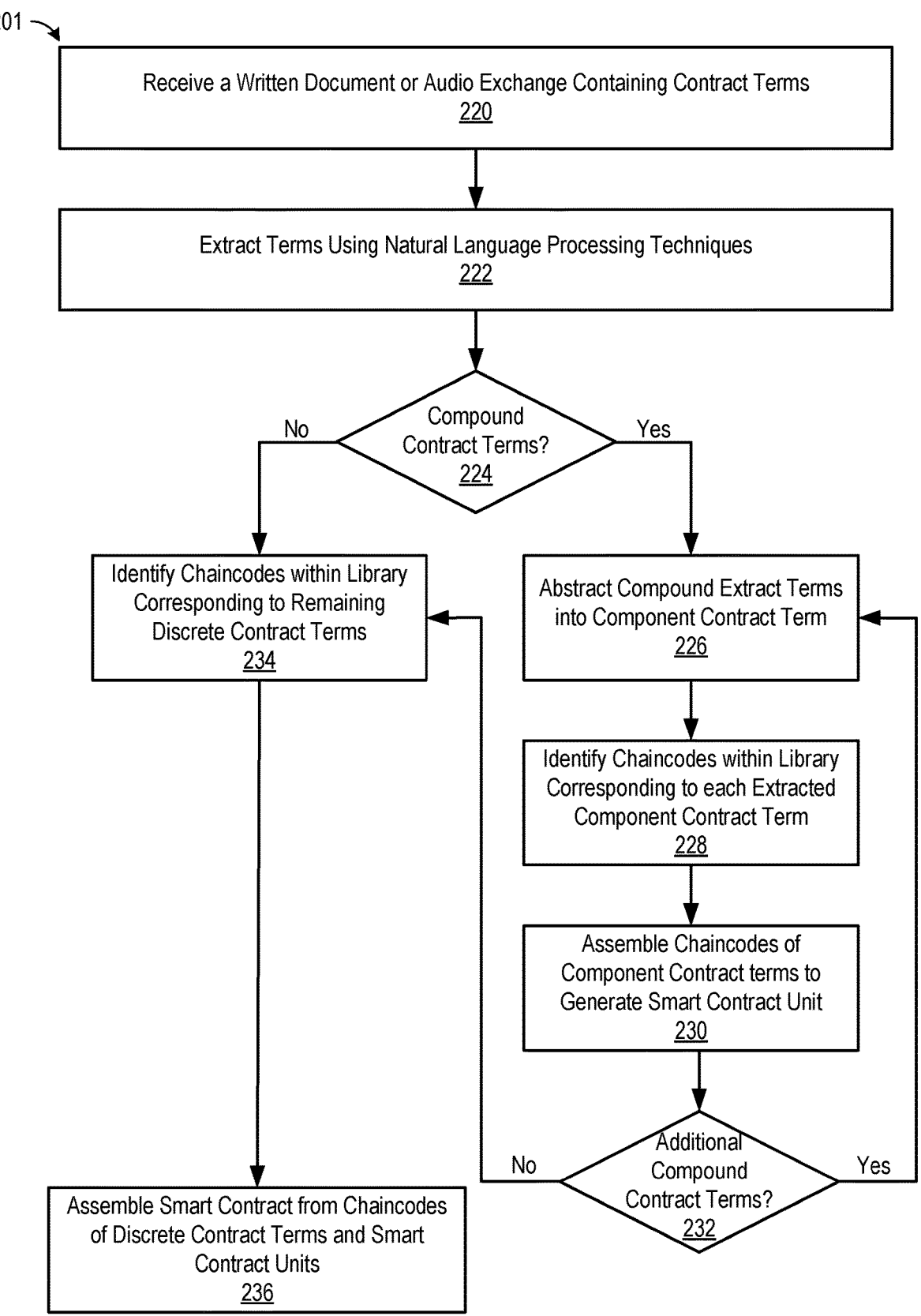
FIG. 2B illustrates a flow diagram of another method for generating a smart contract, according to one embodiment.

FIG. 2B illustrates a flow diagram of another method 201 for generating a smart contract, according to an additional embodiment of the disclosure. As illustrated, a system receives, at 220, a written document (e.g., structured or unstructured) and/or an audio file that contains contract terms. The written document or audio file may be, for example, a written contract, a high-level term sheet, email correspondence, voice records of a deal between two or more parties, a single party document such as a will or trust, and/or another document that specifies actions to be taken with respect to one or more parties in response to triggering events or detectable "states." The system may, according to any of the embodiments described herein, extract, at 222, contract terms using various natural language processing (NLP) techniques.

Some of the contract terms may comprise compound contract terms, at 224, in which case the contract terms are abstracted, at 226, into their component contract terms. Each component contract term is matched, at 228, with a corresponding chaincode within a library or catalog of chaincodes (e.g., chaincode snippets). The chaincodes of each component contract term are combined or assembled, at 230, to generate a smart contract unit (i.e., a portion of the final smart contract) that corresponds to the originally extracted compound contract term. If there are additional compound contract terms, at 232, the process is repeated, at 226-230, for each compound contract term.

Otherwise, if there are no compound contract terms, at 224, or if chaincode compilations have been assembled for all the extracted compound contract terms, at 232, then chaincodes for any remaining discrete contract terms are identified, at 234, within the library. The smart contract generation system assembles the chaincodes of the discrete contract terms together with the smart contract units associated with the compound contract terms to generate, at 236, a smart contract. The auto-executing smart contract can be stored to a blockchain platform for the irrevocable and immutable execution of the original terms of the received contract.

Figure 2C:
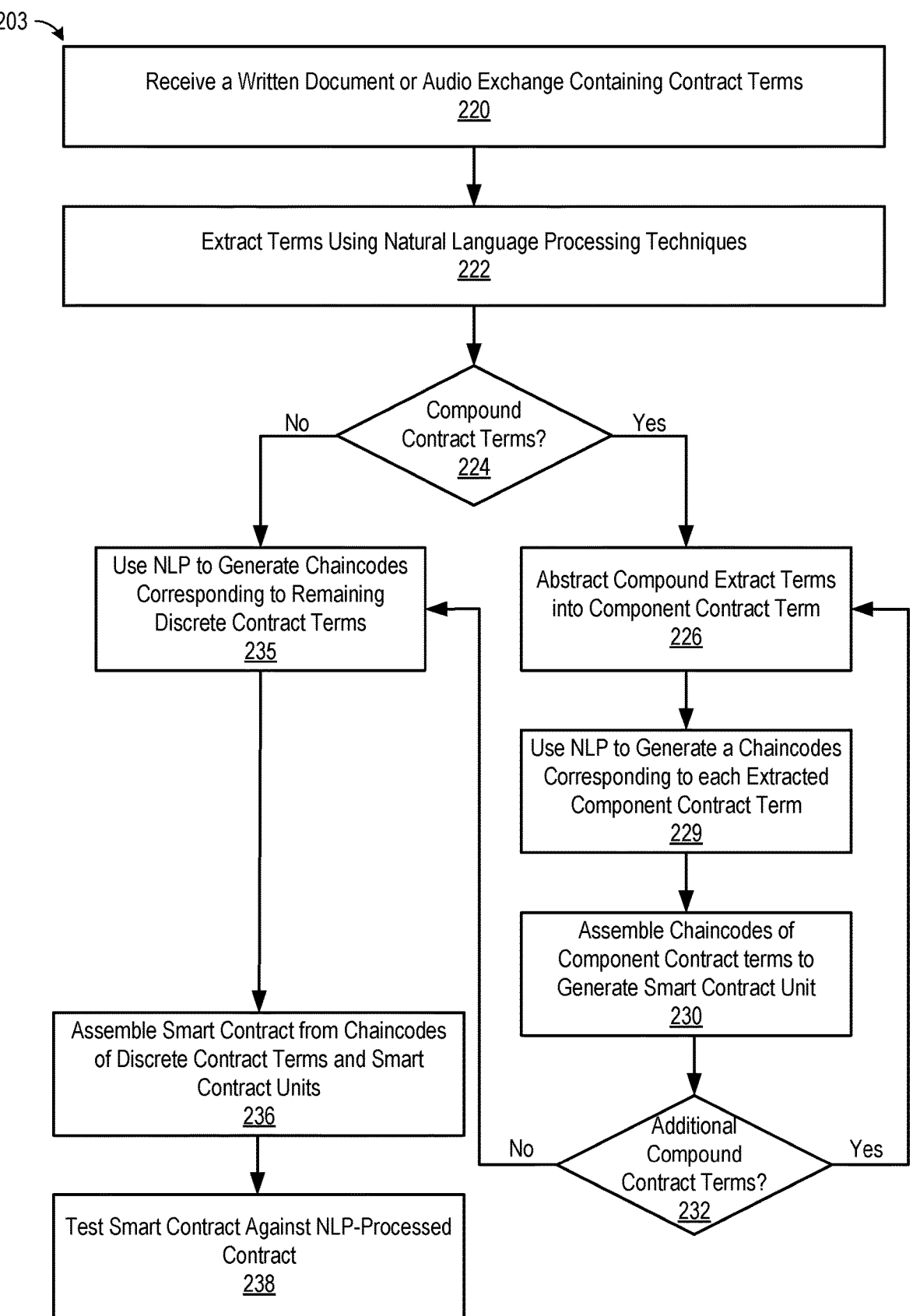
FIG. 2C illustrates a flow diagram of another method for generating a smart contract, according to one embodiment.

FIG. 2C illustrates a flow diagram of another method 203 for generating a smart contract, according to an additional embodiment of the present disclosure. Similar to FIG. 2B, the system receives, at 220, a contract and extracts, at 222, contract terms from the contract. Compound contract terms are abstracted into component contract terms, at 224 and 226. A fine-tuned natural language processing model (e.g., FILBERT, as described herein) may be used to generate a chaincode corresponding to each extracted component contract term, at 228. The chaincodes or chaincode snippets are assembled to form a portion of a smart contract or a smart contract unit that corresponds to the identified compound contract term, at 230. The process, at 226-232, is repeated for each compound contract term. The fine-tuned natural language processing model may be used to generate, at 235, chaincodes for any remaining discrete contract terms. The chaincodes and smart contract units may be assembled, at 236, to generate a complete smart contract. In some embodiments, the system may then test, at 238, the smart contract against the original contract (e.g., the system's understanding of the original contract as processed by a natural language processing algorithm) to confirm that the functionality is equivalent.

Accordingly, methods of generating a smart contract may include inputting natural language contract terms into a smart contract generation system, identifying the natural language contract terms with a natural language processing system, and abstracting compound natural language contract terms into component contract terms. The methods may further include correlating at least some of the component contract terms to chaincodes stored in a library, generating chaincodes for any component contract terms that do not correlate to any chaincodes stored in the library, and assembling the chaincodes into a smart contract. The methods may also include testing the smart contract against the natural language contract terms and inputting feedback into the smart contract generation system to verify and improve the chaincodes generated and stored in the library.

Figure 3:
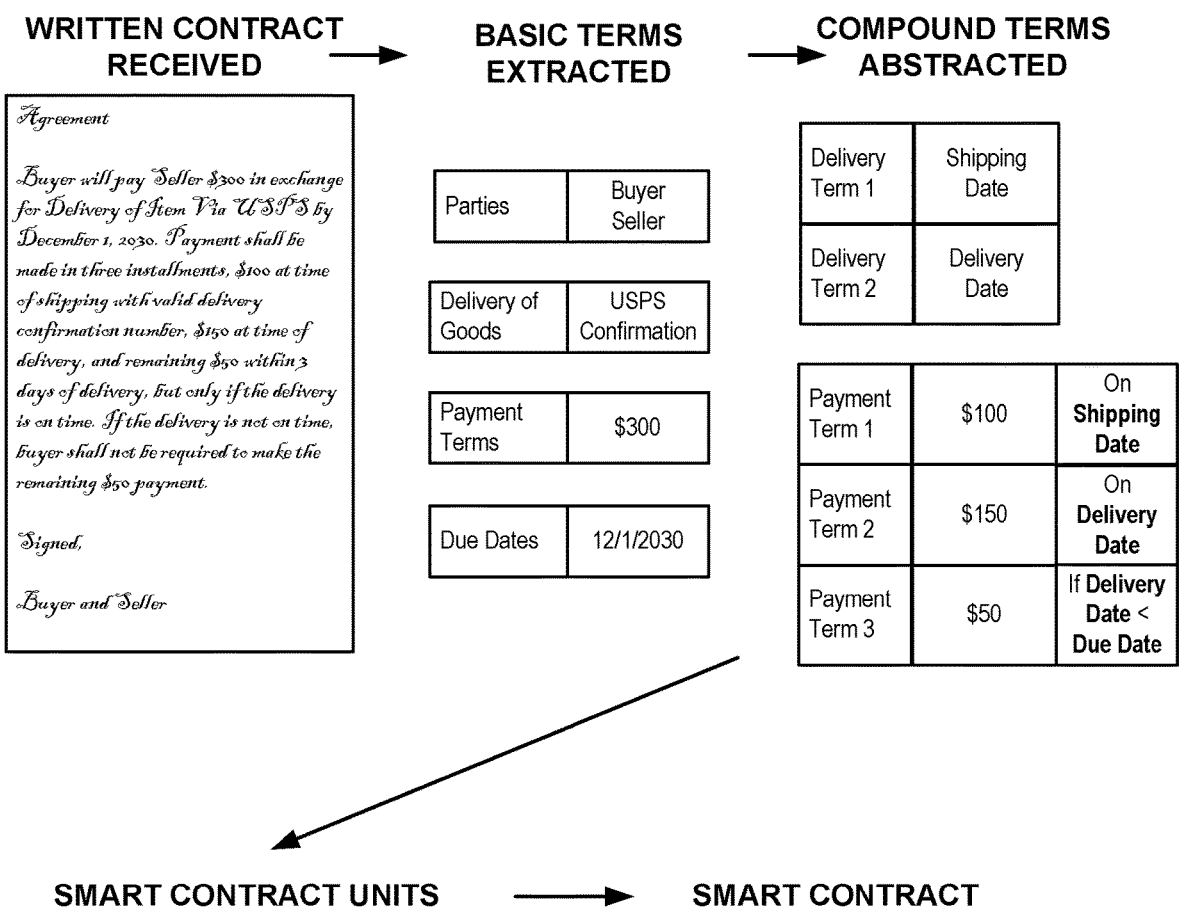
FIG. 3 illustrates a simplified block diagram of an example of a written contract being converted to a smart contract, according to one embodiment.

FIG. 3 illustrates a simplified block diagram of an example of a written contract being converted to a smart contract, according to one embodiment. As illustrated, a written contract is received by the system. The system extracts basic terms of the contract. The illustrated embodiment is oversimplified since the actual number of contract terms and the complexity of the contract terms cannot be accommodated in a single drawing. Some of the terms of the contract may be compound terms. For example, at a high level, payment terms may be considered a basic contract term. In some instances, the payment terms may be as straightforward as a payment to be made on a certain date. In the illustrated example, the payment terms comprise a compound contract term that includes three component terms relating to the shipping date, the delivery date, and an on-time optional provision.

Each of the contract terms, including the component contract term of compound contract terms may be matched with smart contract units, chaincodes, and/or chaincode snippets. The chaincode snippets, chaincodes, and/or smart contract units may be assembled to generate a smart contract that can be uploaded to a block chain for automatic execution.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware, and/or software modules or components. As used herein, a module or component may include various hardware components, firmware code, and/or any type of computer instruction or computer-executable code located within a memory device and/or transmitted as transitory or non-transitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application-specific integrated circuits (ASICs), and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A system, comprising:

a first subsystem to receive a written or verbal contract;

a second subsystem to form a set of processed NLP terms by:

identifying terms of the contract using a machine-learning based natural language processing (NLP) model, and abstracting compound NLP contract terms into a plurality of component contract terms to form a set of processed NLP;

a third subsystem to:

correlate processed NLP terms of the contract with chaincode in a library;

generate chaincode for the terms of the contract for which there is no correlating chaincode stored in the library;

receive per-term user feedback for reinforced learning to generate:

(i) a subset of reinforced new chaincodes approved by the user feedback, and (ii) a subset of corrected new chaincodes that are corrected based on the user feedback, wherein the per-term user feedback either approves a generated chaincode as correctly correlating to an identified natural language contract term or supplies a corrected chaincode that replaces the generated chaincode for that identified term;

fine-tune the machine-learning based NLP model using the subset of reinforced new chaincodes and the subset of corrected new chaincodes as training data associated with their corresponding natural language contract terms, thereby decreasing inaccuracies of future chaincode generation;

store the subset of reinforced new chaincodes and the subset of corrected new chaincodes in the library; and a fourth subsystem to combine correlated NLP terms to generate a smart contract using:

(i) the existing chaincodes that correlate to the natural language contract terms, (ii) the reinforced new chaincodes approved by the user feedback, and (iii) the corrected new chaincodes that are corrected based on the user feedback.

2. The system of claim 1, further comprising a computer-readable storage medium that stores at least one of the first subsystem, the second subsystem, the third subsystem, and the fourth subsystem.

3. The system of claim 2, wherein the computer-readable storage medium is a non-transitory computer-readable storage medium.

4. The system of claim 2, further comprising a bus connecting a processor, a memory, and a network interface to the computer-readable storage medium.

5. The system of claim 1 further configured to utilize a FILBERT natural language model to generate chaincode.

6. The system of claim 1 further configured to utilize a GPT based model to generate chaincode.

7. A method of generating a smart contract, the method comprising:

causing natural language contract terms to be input into a smart contract generation system;

causing the natural language contract terms to be identified with a machine-learning based natural language processing model;

causing compound natural language contract terms to be abstracted into a pluraity of component contract terms;

causing at least some of the component contract terms to be correlated to chaincodes stored in a library;

causing new chaincodes to be generated that correlate to at least some of the component contract contract terms for which existing chaincodes are not stored in the library;

inputting per-term user feedback on the correlation between the component contract contract terms and the associated new chaincodes for reinforced learning to generate:

(i) a subset of reinforced new chaincodes approved by the user feedback, and (ii) a subset of corrected new chaincodes that are corrected based on the user feedback, wherein the per-term user feedback either approves a generated chaincode as correlating to an identified natural-language contract term or supplies a corrected chaincode that replaces the generated chaincode for that identified term;

fine-tuning parameters of the machine-learning based natural language processing model using the reinforced new chaincodes and the corrected new chaincodes as labeled training data associated with their corresponding natural-language contract terms, thereby decreasing inaccuracies and contextual misalignments of future chaincode generation;

assembling a smart contract using:

(i) the existing chaincodes that correlate to the natural language contract terms, (ii) the reinforced new chaincodes approved by the user feedback, and (iii) the corrected new chaincodes that are corrected based on the user feedback; and causing the assembled smart contract to be tested against the natural-language contract terms and:

responsive to successful testing, storing the reinforced new chaincodes and the corrected new chaincodes in the library for future use as existing chaincodes, and disregarding generated chaincodes that are neither approved nor corrected.

* * * * *